United States Patent
Lee et al.

(10) Patent No.: US 9,574,059 B2
(45) Date of Patent: Feb. 21, 2017

(54) THERMAL INSULATION EXPANDABLE POLYSTYRENE PARTICLES AND METHOD OF PREPARING THE SAME

(71) Applicant: SH ENERGY & CHEMICAL CO., LTD., Jeonlabuk-do (KR)

(72) Inventors: Kyu Bong Lee, Gyeonggi-do (KR); Young Soo Kim, Gyeonggi-do (KR); Young Jin Cho, Jeollabuk-do (KR); Soo Jin Park, Jeollabuk-do (KR)

(73) Assignee: SH ENERGY & CHEMICAL CO., LTD, Jeonlabuk-do (KR)

( * ) Notice: Subject to any disclaimer, the term of this patent is extended or adjusted under 35 U.S.C. 154(b) by 49 days.

(21) Appl. No.: 14/653,942

(22) PCT Filed: Aug. 29, 2013

(86) PCT No.: PCT/KR2013/007773
§ 371 (c)(1),
(2) Date: Jun. 19, 2015

(87) PCT Pub. No.: WO2015/030273
PCT Pub. Date: May 3, 2015

(65) Prior Publication Data
US 2016/0208069 A1 Jul. 21, 2016

(30) Foreign Application Priority Data

Aug. 27, 2013 (KR) ........................ 10-2013-0101630

(51) Int. Cl.
*C08J 9/224* (2006.01)
*C08F 12/08* (2006.01)
*C08J 9/00* (2006.01)
*C08J 9/228* (2006.01)
*E04B 1/78* (2006.01)

(52) U.S. Cl.
CPC ............... *C08J 9/224* (2013.01); *C08F 12/08* (2013.01); *C08J 9/0023* (2013.01); *C08J 9/0066* (2013.01); *C08J 9/228* (2013.01); *E04B 1/78* (2013.01); *C08J 2201/036* (2013.01); *C08J 2325/06* (2013.01); *C08J 2411/00* (2013.01)

(58) Field of Classification Search
None
See application file for complete search history.

(56) References Cited

FOREIGN PATENT DOCUMENTS

| BY | 14842 C1 | 10/2011 |
|---|---|---|
| GB | 1012277 | 12/1965 |
| JP | 2009175601 | 7/2009 |
| KR | 100780926 B1 | 11/2007 |
| KR | 1020080100763 A | 11/2008 |
| KR | 1020090071609 A | 7/2009 |
| KR | 1020100120088 A | 11/2010 |
| KR | 1020100124661 A | 11/2010 |
| KR | 10-2011-0065538 | * 7/2011 |
| KR | 1020130003899 A | 1/2013 |
| RU | 0002427595 C2 | 8/2011 |

OTHER PUBLICATIONS

International Search Report for related international application No. PCT/KR2013/007773, report dated May 28, 2014.
Office Action for related Russian Patent Application No. 2015115281; action dated Oct. 5, 2016.

* cited by examiner

*Primary Examiner* — Kara Boyle
(74) *Attorney, Agent, or Firm* — Miller, Matthias & Hull LLP

(57) ABSTRACT

The present invention relates to a method of preparing thermal insulation expandable polystyrene particles and thermal insulation expandable polystyrene particles, and more particularly to a method of preparing thermal insulation expandable polystyrene particles which include preparing a mixture of expandable polystyrene particles and a thermal insulation material by mixing the expandable polystyrene particles and the thermal insulation material; preparing a mixture solution by dissolving chlorinated paraffin and at least one of a paraffin oil and a rubber resin in an organic solvent dissolving styrene; and softening a surface layer of the expandable polystyrene particles by spraying the mixture with the mixture solution, while stirring the mixture, and infiltrating the thermal insulation material, the chlorinated paraffin and the at least one of the paraffin oil and the rubber resin into the surface layer of the expandable polystyrene particles, and thermal insulation expandable polystyrene particles prepared by the same.

24 Claims, No Drawings

THERMAL INSULATION EXPANDABLE POLYSTYRENE PARTICLES AND METHOD OF PREPARING THE SAME

CROSS-REFERENCE TO RELATED APPLICATIONS

This application is a 35 U.S.C §371 U.S. national stage filing of International Patent Application No. PCT/KR2013/007773 filed on Aug. 29, 2013.

FIELD OF THE DISCLOSURE

The present invention relates to thermal insulation expandable polystyrene particles and a method of preparing the same.

BACKGROUND OF THE DISCLOSURE

Styrofoam is widely used as an insulation material for buildings due to excellent productivity and thermal insulation, light weight and affordable price. However, according to environment-friendly policies for energy saving and low-carbon emission, styrofoam with improved thermal insulation property and flame retardancy is required both domestically and internationally. Improvement in thermal insulation of styrofoam may not only achieve energy saving and reduce density and thickness of styrofoam to involve a less amount of styrofoam, contributing to a decrease in manufacture costs, but also increase a living space. Accordingly, various attempts are made to enhance thermal insulation property of styrofoam, for example, 1) a method of preparing expandable polystyrene particles in which graphite or a material for enhancing thermal insulation property is dispersed by adding graphite or the material for enhancing thermal insulation property in polymerization of expandable polystyrene, 2) a method of preparing expandable polystyrene particles in which graphite or material for enhancing thermal insulation property is dispersed by thermally melting polystyrene and injecting and extruding graphite, the material for enhancing thermal insulation property and a foaming agent, and 3) a method of preparing expandable polystyrene particles which a material for enhancing thermal insulation property is infiltrated into and applied to by infiltrating and applying the material for enhancing thermal insulation property to a surface layer of the expandable polystyrene particles using an organic solvent.

However, the foregoing methods may achieve thermal insulation improving effects but involve complicated manufacture processes, lowered cost efficiency in equipment and manufacture costs and difficulty in obtaining satisfactory fusion property, compressive strength and flexural breaking load in molding.

SUMMARY OF THE DISCLOSURE

The present invention is conceived to solve the foregoing problems, and an aspect of the present invention provides a method of preparing thermal insulation expandable polystyrene particles which is capable of preparing thermal insulation expandable polystyrene particles exhibiting excellent thermal insulation property and having improved physical properties, such as thermal conductivity, flexural breaking load and compressive strength, with affordable costs.

Another aspect of the present invention provides thermal insulation expandable polystyrene particles prepared by the foregoing method.

Still another aspect of the present invention provides thermal insulation expandable polystyrene particles having excellent physical properties, such as thermal insulation, thermal conductivity, flexural breaking load and compressive strength.

However, technical problems the present invention aims at solving are not limited to the aforementioned, but those skilled in the art would clearly understood other technical problems unstated herein from descriptions as follows.

According to an aspect of the present invention, there is provided a method of preparing a thermal insulation polystyrene foam particle, the method including preparing a mixture of expandable polystyrene particles and a thermal insulation material by mixing the expandable polystyrene particles and the thermal insulation material; preparing a mixture solution by dissolving chlorinated paraffin and at least one of a paraffin oil and a rubber resin in an organic solvent capable of dissolving styrene; and softening a surface layer of the expandable polystyrene particles by spraying the mixture with the mixture solution, while stirring the mixture, and infiltrating the thermal insulation material, the chlorinated paraffin and the at least one of the paraffin oil and the rubber resin into the surface layer of the expandable polystyrene particle.

The preparing of the mixture of the expandable polystyrene particles and the thermal insulation material may mix the expandable polystyrene particles and the thermal insulation material to disperse the thermal insulation material in the surface layer of the expandable polystyrene particles.

The thermal insulation material may be present in an amount of 0.05 to 10 parts by weight based on 100 parts by weight of the expandable polystyrene particles. The thermal insulation material may have a diameter of 1 to 70 μm.

The thermal insulation material may include at least one of graphite, silver, copper, tin, aluminum, zinc, nickel, titanium, magnesium, tungsten, diatomite, expanded vermiculite, zeolite, bentorite, perlite, aerogel and carbon nanotube. The graphite may include at least one of flake graphite, expanded graphite and carbon.

The organic solvent may be present in an amount of 0.1 to 10 parts by weight based on 100 parts by weight of the expandable polystyrene particles.

The organic solvent may include at least one of toluene, ethyl benzene, methyl ethyl ketone, styrene monomer, acetone, dimethyl carbonate, cyclopentane, cyclohexane, normal hexane and tetrahydrofuran.

The chlorinated paraffin may be present in an amount of 0.1 to 5 parts by weight based on 100 parts by weight of the expandable polystyrene particles.

The at least one of the paraffin oil and the rubber resin may be present in an amount of 0.05 to 5 parts by weight based on 100 parts by weight of the expandable polystyrene particles.

A mixing ratio (w/w) of the chlorinated paraffin to the at least one of the paraffin oil and the rubber resin may be 1:0.5 to 1:2.

A mixing ratio (w/w) of the chlorinated paraffin to the organic solvent may be 1:1 to 1:3.

A mixing ratio (w/w) of the at least one of the paraffin oil and the rubber resin to the organic solvent may be 1:1 to 1:6.

The rubber resin may include at least one of a butyl rubber, an acrylic rubber and a chlorinated rubber.

The preparing of the mixture solution may be carried out by stirring at 30 to 50° C. and 20 to 500 rpm.

The infiltrating may be carried out by stirring at 50 to 200 rpm.

The method may further include adding at least one of glyceryl monostearate, glyceryl tristearate, zinc stearate and magnesium stearate as an anti-blocking agent to coat the surface layer of the expandable polystyrene particle after the infiltrating.

The anti-blocking agent may be present in an amount of 0.05 to 5 parts by weight based on 100 parts by weight of the expandable polystyrene particles.

According to another aspect of the present invention, there are provided thermal insulation expandable polystyrene particles prepared by the method.

According to still another aspect of the present invention, there are provided thermal insulation expandable polystyrene particles including expandable polystyrene particles; and a thermal insulation material, chlorinated paraffin and at least one of a paraffin oil and a rubber resin dispersed in a surface layer of the expandable polystyrene particles.

The thermal insulation material may be dispersed in the surface layer of the expandable polystyrene particles, and the chlorinated paraffin and the at least one of the paraffin oil and the rubber resin may be formed on the layer in which the thermal insulation material is dispersed.

The surface layer in which the thermal insulation material, the chlorinated paraffin and the at least one of the paraffin oil and the rubber resin are dispersed may have a thickness of 1 to 100 μm.

The thermal insulation material, the chlorinated paraffin and the at least one of the paraffin oil and the rubber resin may be infiltrated to coat the surface layer of the expandable polystyrene particles.

The thermal insulation expandable polystyrene particles may be further coated with at least one of glyceryl monostearate, glyceryl tristearate, zinc stearate and magnesium stearate as an anti-blocking agent.

The present invention may provide thermal insulation expandable polystyrene particles having excellent thermal insulation with affordable costs. Also, the present invention may provide thermal insulation expandable polystyrene particles not agglomerating into lumps when packed in a 600-kg bag, and having improved properties, such as thermal conductivity, flexural breaking load and compressive strength, as compared with conventional thermal insulation expandable polystyrene particles infiltrated/coated with chlorinated paraffin only.

DETAILED DESCRIPTION OF THE PRESENTLY PREFERRED EMBODIMENTS

Hereinafter, the present invention will be described in detail.

The present invention relates to a method of preparing thermal insulation expandable polystyrene particles. The method may include preparing a mixture, preparing a mixture solution and infiltrating into a surface layer.

Preparation of Mixture

The preparing of the mixture is preparing a mixture of expandable polystyrene particles and a thermal insulation material by mixing the expandable polystyrene particles with the thermal insulation material, in which the expandable polystyrene particles and the thermal insulation material were mixed so that the thermal insulation material is dispersed in a surface layer of the polystyrene foam particle.

The thermal insulation material is present in an amount of 0.05 to 10 parts by weight, preferably 0.05 to 5 parts by weight based on 100 parts by weight of the expandable polystyrene particles. If the amount of the thermal insulation material is less than 0.05 parts by weight, thermal insulation effect may not be secured. If the amount of the thermal insulation material is greater than 10 parts by weight, a greater amount of a binder may be used for the thermal insulation material to increase costs, or to reduce fusion, causing deterioration in physical properties.

The thermal insulation material may have a diameter of 1 to 70 μm to be uniformly dispersed.

The thermal insulation material may be a thermally conductive material or a porous material capable of blocking heat transfer to provide insulation effects. For example, the thermal insulation material may include at least one of graphite, silver, copper, tin, aluminum, zinc, nickel, titanium, magnesium, tungsten, diatomite, expanded vermiculite, zeolite, bentorite, perlite, aerogel and carbon nanotube, without being limited thereto. Preferably, the thermal insulation material includes graphite, diatomite, zinc, perlite, copper and aluminum. The graphite may include flake graphite, expanded graphite and carbon.

Preparation of Mixture Solution

The preparing of the mixture solution is preparing a mixture solution by dissolving chlorinated paraffin and at least one of a paraffin oil and a rubber resin in an organic solvent capable of dissolving styrene. The preparing of the mixture solution may be carried out by stirring at 30 to 50° C. and 20 to 500 rpm.

The organic solvent may include any solvent capable of dissolving styrene, for example, at least one of toluene, ethyl benzene, methyl ethyl ketone, styrene monomer, acetone, dimethyl carbonate, cyclopentane, cyclohexane, normal hexane and tetrahydrofuran, without being limited thereto. Preferably, methyl ethyl ketone is used in view of hydrophilicity and harmfulness to human body.

The chlorinated paraffin is present in an amount of 0.1 to 5 parts by weight, preferably 0.5 to 2 parts by weight based on 100 parts by weight of the expandable polystyrene particles. If the amount of the chlorinated paraffin is less than 0.1 parts by weight, dispersion of the thermal insulation material may deteriorate, making it difficult to obtain effects of improving thermal insulation property and flame retardancy. If the amount of the chlorinated paraffin is greater than 5 parts by weight, it may be difficult to uniformly coat a surface the expandable polystyrene particles with the chlorinated paraffin and cohesion between the particles may occur. A mixing ratio (w/w) of the chlorinated paraffin to the organic solvent is 1:1 to 1:3 in view of solubility of the chlorinated paraffin and uniform infiltration of the chlorinated paraffin into the surface layer of the polystyrene particles.

The at least one of the paraffin oil and the rubber resin is present in an amount of 0.05 to 5 parts by weight, preferably 0.2 to 2.0 parts by weight based on 100 parts by weight of the expandable polystyrene particles. The paraffin oil and the rubber resin may enhance fusion properties in a molding process to improve flexural breaking load and absorptivity and reduce processing and production cycle time to improve productivity. Further, the paraffin oil and the rubber resin may prevent the particles from agglomerating into lumps in manufacturing and packing a product.

If the amount of the at least one of the paraffin oil and the rubber resin is less than 0.05 parts by weight, flexural breaking load and absorptivity may not be improved. If the amount of the at least one of the paraffin oil and the rubber resin is greater than 5 parts by weight, an excessive amount of the at least one of the paraffin oil and the rubber resin may involve heavier production equipment, thus increasing manufacture costs and reducing productivity.

A mixing ratio (w/w) of the chlorinated paraffin to the at least one of the paraffin oil and the rubber resin is 1:0.5 to 1:2. Within this range, physical properties of the insulation material, such as thermal conductivity, flexural breaking load, absorptivity and flame retardancy, may be improved. A mixing ratio (w/w) of the at least one of the paraffin oil and the rubber resin to the organic solvent may be 1:1 to 1:6 considering solubility of the paraffin oil and the rubber resin.

The rubber resin may include at least one of a butyl rubber, an acrylic rubber and a chlorinated rubber.

Infiltrating into Surface Layer

The infiltrating into the surface layer is dispersing the thermal insulation material, the chlorinated paraffin and the at least one of the paraffin oil and the rubber resin in the surface layer of the expandable polystyrene particles by spraying the mixture with the mixture solution, while stirring the mixture. In detail, the dispersing in the surface layer is softening the surface layer of the expandable polystyrene particles using the mixture solution and infiltrating the thermal insulation material, the chlorinated paraffin and the at least one of the paraffin oil and the rubber resin into the surface layer of the expandable polystyrene particles to coat the surface layer. That is, when the surface of the expandable polystyrene particles is dissolved by the organic solvent, the thermal insulation material dispersed in the surface layer is infiltrated to coat the surface layer and then the chlorinated paraffin and the at least one of the paraffin oil and the rubber resin are applied thereon.

The thermal insulation material, the chlorinated paraffin and the at least one of the paraffin oil and the rubber resin may be distributed at random in a predetermined thickness range around the surface of the expandable polystyrene particles with the expandable polystyrene particles as a center. Alternatively, a thermal insulation material dispersing layer may be formed with a predetermined thickness in the surface layer of the expandable polystyrene particles and the chlorinated paraffin and the at least one of the paraffin oil and the rubber resin may be formed on the thermal insulation material dispersing layer, that is, a layer of the thermal insulation material and a layer of the chlorinated paraffin and the at least one of the paraffin oil and the rubber resin may be separated from each other.

The surface layer in which the thermal insulation material, the chlorinated paraffin and the at least one of the paraffin oil and the rubber resin are dispersed has a thickness of 1 μm or larger, preferably 1 to 100 μm.

The infiltrating may be carried out by stirring at room temperature and 50 to 200 rpm for uniform infiltration into the surface layer of the expandable polystyrene particles.

The method may further include coating after the infiltrating. The coating is coating the infiltrated and coated surface of the expandable polystyrene particles with an anti-blocking agent. The anti-blocking agent may include at least one of glyceryl monostearate, glyceryl tristearate, zinc stearate and magnesium stearate.

The anti-blocking agent is added in an amount of 0.05 to 5 parts by weight, preferably 0.1 to 1.0 part by weight based on 100 parts by weight of the expandable polystyrene particles. If the amount of the anti-blocking agent is less than 0.05 parts by weight, anti-blocking effects may decrease. If the amount of the anti-blocking agent is greater than 5 parts by weight, the anti-blocking agent may not adhere to the expandable polystyrene particles and fusion may deteriorate in processing and molding, causing a decrease in flexural breaking load.

The present invention also relates to thermal insulation expandable polystyrene particles, and more particularly to thermal insulation expandable polystyrene particles which includes expandable polystyrene particles, and a thermal insulation material, chlorinated paraffin and at least one of paraffin oil and a rubber resin dispersed in a surface layer of the expandable polystyrene particles. Preferably, the thermal insulation material, the chlorinated paraffin and the at least one of the paraffin oil and the rubber resin are infiltrated to coat the surface layer of the expandable polystyrene particles. The thermal insulation expandable polystyrene particles may be prepared by the preparing method according to the present invention.

The surface layer in which the thermal insulation material, the chlorinated paraffin and the at least one of the paraffin oil and the rubber resin are dispersed may have a thickness of 1 to 100 μm. A surface of the thermal insulation expandable polystyrene particles may be further coated with an anti-blocking agent, and examples of the anti-blocking agent have been mentioned above.

Although the present invention will be described in detail with reference to the following illustrative examples, various changes and modifications may be made by those having ordinary skill in the art without departing from the spirit and scope of the invention defined by the claims.

Example 1

300 kg of expandable polystyrene particles (SE 2500, SH Energy & Chemical CO., Ltd.) and 3 kg of flake graphite with a diameter of 8 μm were stirred at a constant temperature of 50° C. or lower and 50 to 200 rpm, using a super-mixer so that graphite adhered to the expandable polystyrene particles. The resulting mixture was sprayed with 7.5 kg of a solution prepared by dissolving 1.0 kg of chloroprene rubber as a rubber resin, 3.5 kg of chlorinated paraffin and 3.0 kg of a paraffin oil in 3.5 kg of methyl ethyl ketone while stirring for 5 minutes so that the flake graphite, chloroprene rubber and chlorinated paraffin were infiltrated to coat a surface of the expandable polystyrene particles and drying for 10 minutes, followed by coating with 1 kg of powdered stearic acid prepared by mixing glycerol monostearate, glycerol tristearate and zinc stearate at 1:1:1, thereby producing graphite-infiltrated and coated expandable polystyrene particles. The obtained expandable polystyrene particles were packed in a 600-kg bag, stacked on two levels and kept in a drying room at a constant internal temperature of 60° C., observing every day for 60 days whether lumps were formed. Molded foam (styrofoam) with excellent thermal insulation property was manufactured using a general method of foaming and molding polystyrene resin foam particles. Physical properties of the molded product were evaluated using a KSM 3808-bead method type 2.

Example 2

Molded foam (styrofoam) with excellent thermal insulation property was manufactured in the same manner as in Example 1 except that expanded graphite was used. Physical properties of the molded product were evaluated using the KSM 3808-bead method type 2.

Example 3

Expandable polystyrene particles were prepared in the same manner as in Example 1 except that a mixture of 2.4 kg of flake graphite and 0.6 kg of diatomite was used instead of 3 kg of flake graphite. The prepared expandable polystyrene particles were packed in a 600-kg bag, stacked on two levels and kept in a drying room at a constant internal temperature of 60° C., observing every day for 60 days whether lumps were formed. Molded foam (styrofoam) with excellent thermal insulation property was manufactured using a general method of foaming and molding polystyrene resin foam particles. Physical properties of the molded product were evaluated using a KSM 3808-bead method type 2.

Example 4

Molded foam (styrofoam) with excellent thermal insulation property was manufactured in the same manner as in Example 3 except that expanded vermiculite was used instead of diatomite. Physical properties of the molded product were evaluated using the KSM 3808-bead method type 2.

Example 5

Molded foam (styrofoam) with excellent thermal insulation property was manufactured in the same manner as in Example 3 except that perlite was used instead of diatomite. Physical properties of the molded product were evaluated using the KSM 3808-bead method type 2.

Example 6

Molded foam (styrofoam) with excellent thermal insulation property was manufactured in the same manner as in Example 3 except that zinc powder was used instead of diatomite. Physical properties of the molded product were evaluated using the KSM 3808-bead method type 2.

Example 7

Molded foam (styrofoam) with excellent thermal insulation property was manufactured in the same manner as in Example 3 except that copper powder was used instead of diatomite. Physical properties of the molded product were evaluated by the same method as used in Example 3

Example 8

Molded foam (styrofoam) with excellent thermal insulation property was manufactured in the same manner as in Example 3 except that aluminum powder was used instead of diatomite. Physical properties of the molded product were evaluated using the KSM 3808-bead method type 2.

TABLE 1

| | | | Example | | | | | | | |
|---|---|---|---|---|---|---|---|---|---|---|
| | | Criteria | 1 | 2 | 3 | 4 | 5 | 6 | 7 | 8 |
| Lump | Period | 60 days or more | 60 days or more | 60 days or more | 60 days or more | 60 days or more | 60 days or more | 60 days or more | 60 days or more | 60 days or more |
| KSM 3808 Bead method type 2 | Density (kg/m$^3$) | 25 or higher | 26.2 | 25.9 | 26.1 | 25.8 | 25.7 | 26.0 | 25.9 | 25.7 |
| | Initial thermal conductivity (w/m · k) | 0.032 or lower | 0.029 | 0.029 | 0.029 | 0.029 | 0.029 | 0.029 | 0.029 | 0.029 |
| | Flexural breaking load (N) | 30 or higher | 38 | 40 | 39 | 38 | 39 | 37 | 38 | 37 |
| | Compressive strength (N/m$^2$) | 12 or higher | 15 | 15 | 16 | 15 | 16 | 15 | 15 | 15 |
| | Absorptivity (g/100 cm$^2$) | 1.0 or lower | 0.4 | 0.3 | 0.3 | 0.3 | 0.4 | 0.3 | 0.3 | 0.3 |
| | Combustibility Combustion time | Within 120 sec | 0 | 0 | 0 | 0 | 0 | 0 | 0 | 0 |
| | Combusted length | 60 mm or lower | 0 | 0 | 0 | 0 | 0 | 0 | 0 | 0 |

Comparative Example 1

300 kg of expandable polystyrene particles (SE 2500, SH Energy & Chemical CO., Ltd.) and 3 kg of flake graphite with a diameter of 8 μm were stirred at a constant temperature of 50° C. or lower and 50 to 200 rpm, using a super-mixer so that graphite adhered to the expandable polystyrene particles. The resulting mixture was sprayed with 7.5 kg of a solution prepared by dissolving 3.0 kg of chlorinated paraffin in 4.5 kg of methyl ethyl ketone while stirring, followed by drying for 10 minutes, thereby producing graphite-infiltrated and coated expandable polystyrene particles. The obtained expandable polystyrene particles were packed in a 600-kg bag, stacked on two levels and kept in a drying room at a constant internal temperature of 60° C., observing every day for 60 days whether lumps were formed. Molded foam (styrofoam) with excellent thermal insulation property was manufactured using a general method of foaming and molding expandable polystyrene particles. Physical properties of the molded product were evaluated using a KSM 3808-bead method type 2.

Comparative Example 2

Expandable polystyrene particles were prepared in the same manner as in Comparative Example 1 except that a mixture of 2.4 kg of flake graphite and 0.6 kg of diatomite was used instead of 3 kg of flake graphite. The prepared expandable polystyrene particles were packed in a 600-kg bag, stacked on two levels and kept in a drying room at a constant internal temperature of 60° C., observing every day for 60 days whether lumps were formed. Molded foam (styrofoam) with excellent thermal insulation property was manufactured using a general method of foaming and molding polystyrene resin foam particles. Physical properties of the molded product were evaluated using a KSM 3808-bead method type 2.

Comparative Example 3

Expandable polystyrene particles were prepared in the same manner as in Example 1 except that a mixture of 2.4 kg of flake graphite and 0.6 kg of diatomite was used instead of 3 kg of flake graphite. The prepared expandable polystyrene particles were packed in a 600-kg bag, stacked on two levels and kept in a drying room at a constant internal temperature of 60° C., observing every day for 60 days whether lumps were formed. Molded foam (styrofoam) with excellent thermal insulation property was manufactured using a general method of foaming and molding polystyrene resin foam particles. Physical properties of the molded product were evaluated using a KSM 3808-bead method type 2.

TABLE 2

| | | | Comparative Example | | |
|---|---|---|---|---|---|
| | | Criteria | 1 | 2 | 3 |
| Lump | Period | 60 days or more | 2 days | 2 days | 2 days |
| KSM 3808 Bead method type 2 | Density (kg/m³) | 25 or higher | 26.2 | 25.9 | 26.1 |
| | Initial thermal conductivity (w/m · k) | 0.032 or lower | 0.032 | 0.032 | 0.032 |
| | Flexural breaking load (N) | 30 or higher | 30 | 30 | 29 |
| | Compressive strength (N/m²) | 12 or higher | 13 | 13 | 14 |
| | Absorptivity (g/100 cm²) | 1.0 or lower | 0.6 | 0.5 | 0.6 |
| | Combustibility Combustion time | Within 120 sec | 5 | 8 | 6 |
| | Combusted length | 60 mm or lower | 10 | 12 | 12 |

As shown in Tables 1 and 2, the expandable polystyrene particles with excellent thermal insulation property prepared in Examples 1 to 8 exhibit excellent properties in thermal conductivity, flexural breaking load, compressive strength and absorptivity, as compared with the conventional expandable polystyrene particles into which only chlorinated paraffin is infiltrated according to Comparative Examples 1 to 3. In particular, when packed in a 600-kg bag and stored on two levels at 60° C., the expandable polystyrene particles according to Examples 1 to 8 never agglomerated into lumps, whereas the chlorinated paraffin-infiltrated expandable polystyrene particles according to Comparative Examples 1 to 3 formed lumps after two days.

The invention claimed is:

1. A method of preparing a thermal insulation polystyrene foam particle, the method comprising:
    preparing a mixture of expandable polystyrene particles and a thermal insulation material by mixing the expandable polystyrene particles and the thermal insulation material;
    preparing a mixture solution by dissolving chlorinated paraffin and at least one of a paraffin oil and a rubber resin in an organic solvent; and
    softening a surface layer of the expandable polystyrene particles by spraying the mixture with the mixture solution, while stirring the mixture, and infiltrating the thermal insulation material, the chlorinated paraffin and the at least one of the paraffin oil and the rubber resin into the surface layer of the expandable polystyrene particles.

2. The method of claim 1, wherein the preparing of the mixture of the expandable polystyrene particles and the thermal insulation material mixes the expandable polystyrene particles and the thermal insulation material to disperse the thermal insulation material into the surface layer of the expandable polystyrene particles.

3. The method of claim 1, wherein the thermal insulation material is present in an amount of 0.05 to 10 parts by weight based on 100 parts by weight of the expandable polystyrene particles.

4. The method of claim 1, wherein the thermal insulation material has a diameter of 1 to 70 µm.

5. The method of claim 1, wherein the thermal insulation material comprises at least one of graphite, silver, copper, tin, aluminum, zinc, nickel, titanium, magnesium, tungsten, diatomite, expanded vermiculite, zeolite, bentorite, perlite, aerogel and carbon nanotube.

6. The method of claim 5, wherein the graphite comprises at least one of flake graphite and expanded graphite.

7. The method of claim 1, wherein the organic solvent is present in an amount of 0.1 to 10 parts by weight based on 100 parts by weight of the expandable polystyrene particles.

8. The method of claim 1, wherein the organic solvent comprises at least one of toluene, ethyl benzene, methyl ethyl ketone, styrene monomer, acetone, dimethyl carbonate, cyclopentane, cyclohexane, normal hexane and tetrahydrofuran.

9. The method of claim 1, wherein the chlorinated paraffin is present in an amount of 0.1 to 5 parts by weight based on 100 parts by weight of the expandable polystyrene particles.

10. The method of claim 1, wherein the at least one of the paraffin oil and the rubber resin is present in an amount of 0.05 to 5 parts by weight based on 100 parts by weight of the expandable polystyrene particles.

11. The method of claim 1, wherein a mixing ratio (w/w) of the chlorinated paraffin to the at least one of the paraffin oil and the rubber resin ranges from 1:0.5 to 1:2.

12. The method of claim 1, wherein a mixing ratio (w/w) of the chlorinated paraffin to the organic solvent ranges from 1:1 to 1:3.

13. The method of claim 1, wherein a mixing ratio (w/w) of the at least one of the paraffin oil and the rubber resin to the organic solvent ranges from 1:1 to 1:6.

14. The method of claim 1, wherein the rubber resin comprises at least one of a butyl rubber, an acrylic rubber and a chlorinated rubber.

15. The method of claim 1, wherein the preparing of the mixture solution is carried out by stirring at 30 to 50° C. and 20 to 500 rpm.

16. The method of claim 1, wherein the infiltrating is carried out by stirring at 50 to 200 rpm.

17. The method of claim 1, further comprising adding at least one of glyceryl monostearate, glyceryl tristearate, zinc stearate and magnesium stearate as an anti-blocking agent to coat the surface layer of the expandable polystyrene particles after the infiltrating.

18. The method of claim 17, wherein the anti-blocking agent is present in an amount of 0.05 to 5 parts by weight based on 100 parts by weight of the expandable polystyrene particles.

19. A thermal insulation expandable polystyrene particle prepared by the method of claim 1.

20. A thermal insulation expandable polystyrene particle comprising:
    expandable polystyrene particles; and
    a thermal insulation material, chlorinated paraffin and at least one of a paraffin oil and a rubber resin dispersed in a surface layer of the expandable polystyrene particles.

21. The thermal insulation expandable polystyrene particles of claim 20, wherein the thermal insulation material is dispersed in the surface layer of the expandable polystyrene particles, and the chlorinated paraffin and the at least one of the paraffin oil and the rubber resin are formed on the layer in which the thermal insulation material is dispersed.

22. The thermal insulation expandable polystyrene particles of claim 20, wherein the surface layer in which the thermal insulation material, the chlorinated paraffin and the at least one of the paraffin oil and the rubber resin are dispersed has a thickness of 1 to 100 μm.

23. The thermal insulation expandable polystyrene particles of claim 20, wherein the thermal insulation material, the chlorinated paraffin and the at least one of the paraffin oil and the rubber resin are infiltrated to coat the surface layer of the expandable polystyrene particles.

24. The thermal insulation expandable polystyrene particles of claim 20, wherein the thermal insulation expandable polystyrene particles are further coated with an anti-blocking agent selected from the group consisting of glyceryl monostearate, glyceryl tristearate, zinc stearate, magnesium stearate and mixtures thereof.

\* \* \* \* \*